Oct. 10, 1950     K. B. OLANDER     2,524,923
IRONING TABLE Filed Aug. 18, 1945                         6 Sheets-Sheet 1

INVENTOR.
KEMUEL B. OLANDER
BY
ATTORNEY

Oct. 10, 1950 K. B. OLANDER 2,524,923
IRONING TABLE
Filed Aug. 18, 1945 6 Sheets-Sheet 2

*INVENTOR.*
KEMUEL B. OLANDER
BY
ATTORNEY

Oct. 10, 1950     K. B. OLANDER     2,524,923
IRONING TABLE
Filed Aug. 18, 1945     6 Sheets-Sheet 3

INVENTOR.
KEMUEL B. OLANDER
BY
ATTORNEY

Oct. 10, 1950     K. B. OLANDER     2,524,923
IRONING TABLE

Filed Aug. 18, 1945     6 Sheets-Sheet 4

*INVENTOR.*
KEMUEL B. OLANDER
BY
ATTORNEY

Oct. 10, 1950 K. B. OLANDER 2,524,923
IRONING TABLE
Filed Aug. 18, 1945 6 Sheets-Sheet 6

INVENTOR.
KEMUEL B. OLANDER
ATTORNEY

Patented Oct. 10, 1950

2,524,923

UNITED STATES PATENT OFFICE 2,524,923

IRONING TABLE

Kemuel B. Olander, Minneapolis, Minn.

Application August 18, 1945, Serial No. 611,315

13 Claims. (Cl. 38—117)

My invention relates to ironing tables having a leg supporting structure adapted to fold forward to be brought in folded position against the under surface of the ironing table top, and has for its object to provide means for latching the legs in fixed relation to the ironing table top when they are opened up in supporting position and the ironing table is supported thereby for operation, said latching means being so arranged and constructed as to be operable for release of the supporting leg structure from either end of the ironing table.

Ironing tables as now manufactured and sold customarily may comprise a pair of pivoted rear legs and a front leg member connected together so they may fold in unison. This connection usually consists of a pair of rods pivoted at their rear ends to intermediate portions of the rear legs and at their front ends to the lower part of the front leg member, and a pair of brace rods, usually pivoted to the rear members at the same point where the first-named rods are pivoted and connected at their front ends to a slide member which is adapted to move along a guide member secured to the under side of the ironing table top. When this leg structure is released the entire assemblage swings forwardly upon the leg pivots under the ironing table top, the slide member moving forwardly so the ironing table top is thereby caused to swing downwardly until the leg structure extends beyond the front end of the top and side, which is the folded and inoperative position of the ironing table.

In this form of ironing table the legs are locked in their table-supporting position by some sort of means which usually holds the slide member against forward movement, and this locking operation and particularly its release and the folding up of the ironing table has always given a considerable degree of trouble. In practice heretofore the release of the locking means has been effected by operating the releasing means in some manner from the rear of the ironing table, and after such release the ironing table top is pulled backwardly upon the rear legs and drops down forwardly upon the folded legs, the whole operation being generally more or less unsatisfactory because the table top goes down with considerable force and the effect and inconvenience of operating it in that manner is reflected also in the strains inflicted upon the ironing table top by the contact of its end in dropping down on the floor.

Efforts heretofore made to conveniently release the locking means and give satisfactory results in folding the legs of the ironing table have been all directed to releasing the locking means at one end and only one end of the ironing table and have been principally directed to releasing the locking means from the rear end of the ironing table. Release of the locking means and folding the leg structure of the ironing table have been considered impractical to accomplish otherwise than from the rear end of the ironing table. Effecting unlocking from the front end is particularly advantageous when, as is the common practice, the woman who is using the ironing table wishes to store it after folding it with the broad rear end contacting the floor, so it will stand steadily against a wall, although releasing from the rear end may be advantageous where it is desired to hang the ironing table from a support in storing. My invention enables the user, usually a woman with relatively limited physical strength, to unlatch and fold the leg structure with one single application of force at either end of the ironing table.

I have discovered that a very simple latching means may be provided embodying a swinging latch member which snaps into position and holds the legs firmly locked in their open and table-supporting position when the board is in use, and that, in combination with means extending to the rear of the ironing table for swinging the hook member to release the slide from the rear end, the same identical hook member may be associated with a pull member, for pulling the slide forward from the front of the ironing table, which is adapted to engage cooperating means on the hook member such that the pull on the pull member will swing the hook member to unlatch the slide and the pull member may then transmit the necessary force to the slide to cause it to move forward to bring the leg members into their folded position.

I have discovered further that this arrangement, including a catch member engageable with a cam surface on the hook member to shift it so the hook will come into locking engagement with the catch member may be worked out by relative movement of the hook and the catch member, in which the hook may be fixedly pivoted to the under side of the board and the catch member move with the slide, or this arrangement may be reversed and the catch be fixedly attached to the under surface of the board and the hook member be pivoted on the slide.

I have further discovered that a hook member may be mounted upon a fixed pivot on the under side of the ironing table top or on a pivot on the slide cooperating with a catch on the slide when it is pivoted to the ironing table top, or with a catch on the table top when it is pivoted to the slide, and that in any such case a manually operated pull member for exerting force to move the slide toward folding position of the leg structure may have a part thereon engageable with a part on the hook member when it is in locking position, whereby the mere exertion of force to pull out toward the front of the board on the slide will automatically unlock and release the hook member, thus permitting the leg structure to be folded from the front of the ironing board.

I also discovered that means extending to a point close to the rear end of the ironing table top on the under side thereof may be positioned and formed so that pulling on such means will swing the hook into unlocking position whether it is mounted on a fixed pivot on the under side of the ironing table top, or is pivoted on the slide member, and the mere exertion of pulling force on said means will first unlatch the hook and then pull the table into folding position.

It is a principal object of my invention, therefore, to provide an ironing table having a folding leg structure for supporting it in conjunction with a slide member connected with the leg structure, and with a single locking member and a latch member relatively movable one to the other for holding the leg structure locked in board-supporting position, in conjunction with means operable upon the single locking member both at the front and at the rear of the ironing table top to release the latch and complete the folding operation with one single effort.

It is a further object of my invention to pivot the locking member directly upon the under side of the ironing table top and to provide said locking member with a hook portion having an outer sloping or bevelled face in the path of relative movement thereof of a catch, so when said relative movement causes the catch to engage the bevelled face it will swing the locking member on its pivot so the hook portion thereof will snap over it locking the legs firmly in position.

It is a further object of my invention to pivot on the slide member which controls the opening and closing of the leg structure a pull lever having a cam-like portion adapted to engage against the bevelled face of the locking member when the slide is in its locking position, said pull lever being toward the front of the ironing table top and shaped and positioned so it will be swung on its pivot when force is applied to it to move the slide, and a part on the lever and a part on the locking member will thereby be caused to engage to move the locking member out of locking position and thus to release the slide.

It is a further object of my invention to support on said slide so as to swing in a horizontal plane on a vertical pivot a swinging lever having a cam-like point adapted to engage against the bevelled face of a hook member when the slide is in its locking position, said swinging lever being at the front end of the board and being so positioned relative to the hook that, by exerting force upon the outer end of the lever, the lever will first be swung to engage the hook and release it from its catch and then the slide and the parts connected with it will be drawn toward the front of the board to effect locking of the leg structure.

It is a further object of my invention to form on the hook, whether pivoted directly to the under surface of the ironing table or pivoted to the slide, an outwardly extending lip having an angularly disposed cam surface at one edge thereof, and to provide means to be engaged by the hook or lock the slide, and to mount on the slide a swinging pull member which extends substantially at right angles downward when the slide and legs are locked, so when force is applied to the pull member it will first swing it on its pivot causing it to engage the cam surface of the hook to move the hook and disengage it from its locking position and then will pull the hook and parts connected therewith forwardly to bring the supporting leg structure to its folded position.

It is a further object of my invention to provide a hook member pivoted to move in a horizontal plane on the slide, and to provide a latch bar fixed on the under side of the ironing table top to be engaged by the hook and lock the parts in fixed table-supporting position, and, mounted to swing on a horizontal pivot on the slide, to provide a pull member having a part thereon engageable with a part on the hook member such that when force is applied to the pull member it will first swing the same and by engagement with the part on the hook will swing the hook from latching engagement with the latch bar and then will move the slide and the leg structure connected therewith toward the forward end of the ironing table into folded position.

It is a further object of my invention, with the structure first recited, to pivot a cam member upon the under side of the ironing table top having a portion engageable with a part on the hook member when the slide is in rearward locking position, and to provide a pull arm extending to the rear of the ironing table, whereby when force is applied to the pull arm it will swing the cam member against a part on the hook and cause disengagement of the hook from its latching member.

It is a further object of my invention to mount upon the slide a hook pivoted to swing in a horizontal plane having a sloping face and to fix relative to the under side of the ironing table a latching bar to be engaged by the said sloping face of the hook and to be snapped by a spring over the bar to lock the parts in leg supporting position, and to form an offset arm on the hook having a pull member thereon such that when force is applied to it to move the slide it will first rock the hook member to unlatch the same and then will cause the slide and the parts connected with it to be drawn to the front of the board to effect folding of the leg structure.

This application is a continuation in part of my application, Serial No. 557,474, filed October 6, 1944, and now abandoned.

The full objects and advantages of my invention will appear in the detailed description given in the following specification and the novel features of the invention by which the aforementioned advantageous results are secured will be particularly pointed out in the claims.

In the drawings illustrating applications of my invention in some of its forms.

Figure 2:
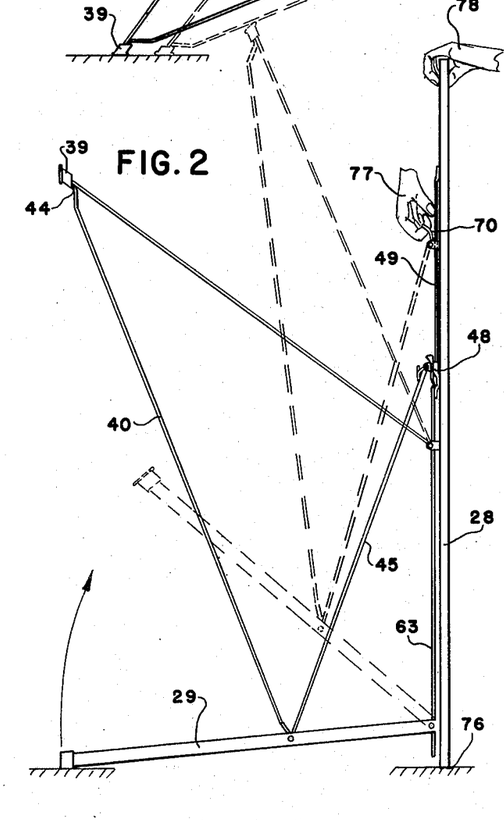
Fig. 2 is a side elevation view of the same ironing table shown in Fig. 1, indicating the manner in which the ironing table will have its leg structure folded operating from the front of the ironing table.
Figure 3:
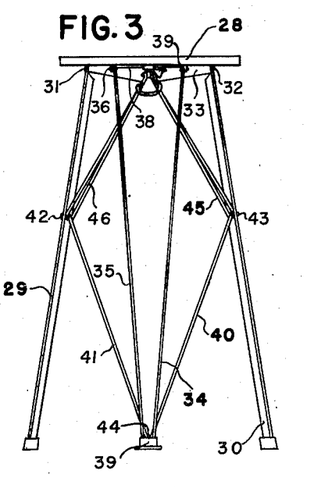
Fig. 3 is an end elevation view of the ironing table shown in Fig. 1 viewed from the front thereof.
Figure 12:
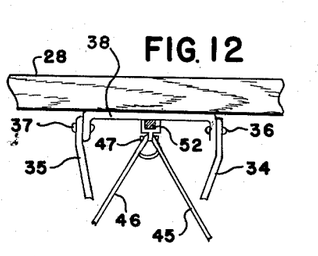
Fig. 12 is a transverse sectional view showing a modified rectangular slide for support of the upper ends of the brace rods, as shown in Fig. 7.
Figure 13:
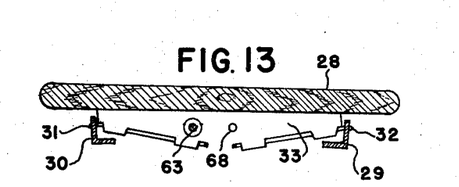
Fig. 13 is a sectional view taken on line 13—13 of Fig. 4.

As illustrated in Figs. 1–13 inclusive, an ironing table top 28 has a pair of rear legs 29 and 30, Figs. 3 and 13, which are pivoted at 31 and 32 to a transverse frame piece 33 secured to the under side and adjacent the rear end of the ironing table top 28. At about the middle of the ironing table top a front leg structure is pivotally connected with the under side thereof. This front leg structure includes a pair of leg bars 34 and 35 which are pivoted at their upper ends at 36 and 37 to a bracket on the under side of the ironing table, indicated at 38.

The front ends of the leg rods 34 and 35 are brought together in a foot member 39, so the entire front leg structure comprises a triangular-shaped leg made up of the members 34 and 35, which has only a single point of contact with the floor in the foot member 39.

The two rear legs and (in effect) the single front leg of the ironing table described above are pivoted to fixed members on the under side of the ironing table. They can, therefore, swing forward to a position contacting the under side of the top. To secure the legs together so that they may be swung in unison are a pair of elongated rods 40 and 41. These rods are secured to the rear legs 28 and 29 by being pivoted thereto at central points in the lengths of said legs indicated at 42 and 43, and the two rods are joined with the foot 39 at the point indicated at 44.

Figure 9:
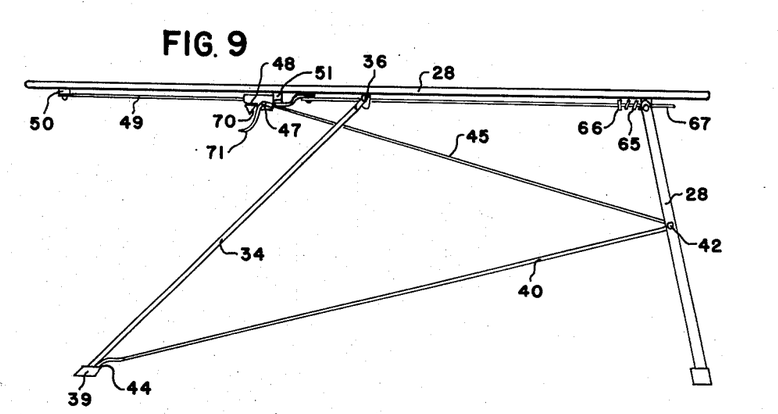
Fig. 9 is a side elevation view of an ironing table with the leg structure in fully opened and locked open position.

This structure would not be effective for a complete supporting means, since it could automatically collapse. Hence a feature of the supporting means of this type of ironing table is a pair of brace rods 45 and 46 and a locking slide. These brace rods Figs. 3 and 9, are pivoted at their lower extremities to the same pivots 42 and 43 to which the leg-connecting rods 40 and 41 are respectively pivoted. The front ends of the brace rods 45 and 46 are pivotally secured, as indicated at 47, to the slide 48, which is mounted to move forwardly along the under side and along the center of the ironing table top on a guide member indicated at 49.

The brace rods 45 and 46 come between the front leg members 34 and 35, Fig. 12, and when the slide 48 is locked on its guide so it can not move along the guide the entire leg structure is held in fixed locked position for supporting the ironing table top in use.

The particular means for an operator to unlatch or release the slide to permit folding of the table easily and conveniently constitutes the substance of my invention.

It must be remembered that ironing tables of the type herein specified are for use in homes and are handled, both in setting up and in taking down, almost exclusively by women. The entire ironing table structure, even when made of wood, is fairly heavy, and when made with a steel top and all steel supporting means that weight is substantially increased. The means herein described and shown constitutes a simple and effective arrangement for easy release of the slide to permit and effect the folding up of the legs of an ironing table without danger of noisy and shattering collapse or of injury either to the operator or to the ironing table.

Figure 4:
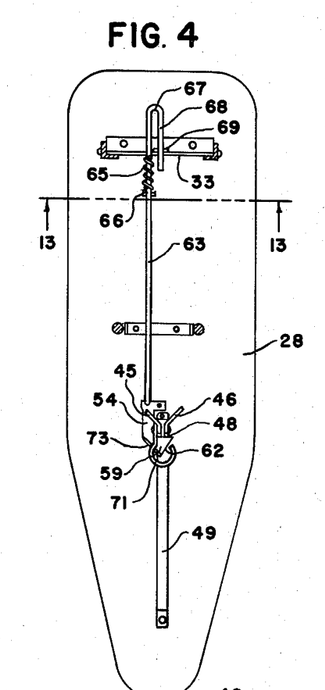
Fig. 4 is an under-side plan view of the board shown in Fig. 1.
Figure 5:
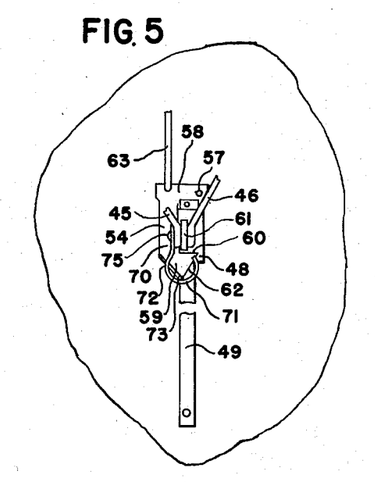
Fig. 5 is an enlarged under-side view of the hook mechanism with the hook in latching position.
Figure 6:
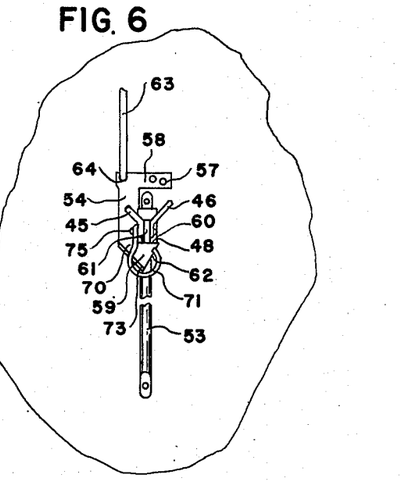
Fig. 6 is a similar view showing a modified form of guide for the slide.

Referring still to the construction shown in Figs. 1–13 inclusive, the slide 48 may be mounted to move along a guideway, enveloped by some part of the slide, which, as shown in Figs. 4, 5 and 9, is held spaced from the under side of the board by blocks 50 and 51. Or the guide may be a rectangular bar 52, as shown in Figs. 7, 8, 10 and 12, similarly held; or it may be a round bar 53 as shown in Fig. 6.

Whichever forms of the slide and guideway, upon which the slide moves longitudinally of the board, may be employed, it will be obvious that the legs can not be moved to be folded against the top excepting when the slide moves along the guideway, and hence that locking the slide in the leg-open position locks the legs in their top-supporting position.

This locking, in any of the forms shown, takes place automatically by merely opening up the leg structure into supporting position. The great difficulty, with which my invention is primarily concerned, is how to effect easy and convenient unlocking of these members and safe and easy folding of the legs, and this involves, as presented herein, both the construction of the locking means, of the means to unlock it, and of the means thereafter for effecting folding of the legs.

Further, such unlocking means, to get the results desired, should be operable either from the rear or from the front of the ironing table top.

Figure 10:
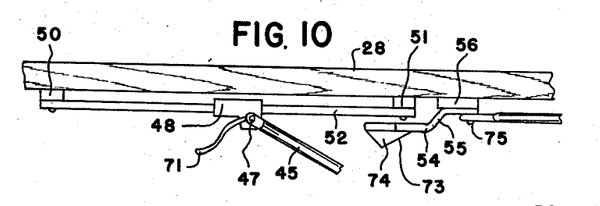
Fig. 10 is an enlarged edge view of part of the board construction alone as shown in Fig. 9.
Figure 11:
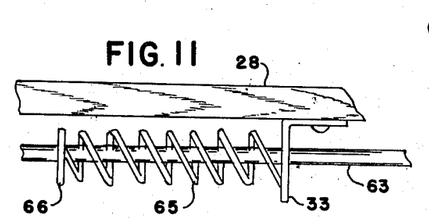
Fig. 11 is an enlarged sectional view illustrating the mounting of the spring for engaging the pull arm to force the hook into locking position.

As clearly shown in Figs. 4, 5, 6 and 12, the locking element comprises a hook member having a body portion 54 preferably with a curved part 55, as shown in Fig. 10, which is pivotally secured through a block 56 to the under side of the table top 28 and adapted to oscillate about its securing pivot 57. The pivot pin 57 is fast on the under side of the top and goes through an arm 58 which extends at right angles for a sufficient distance from the body part 54 of the hook.

The hook head 59 is provided with a right-angled straight face 60, which is adapted to come over a catch or latch 61 which is formed on and is a part of the slide 48. The hook head 59 is also provided with a contact edge 62 which extends at an oblique angle across the path of movement of the part 61 so that when it engages the oblique edge 62 it will swing the hook on its pivot 57 until it passes the latch 61 to permit the right-angled face 60 of the hook head 59 to snap over and engage the latch.

A rear pull rod 63 extends through the bar 33, Fig. 13, and is connected with the hook body 54, as indicated at 64, at a point removed laterally a considerable distance from the pivot point 57 on the hook arm 58. A compression spring 65 between the web of frame piece 33 and a collar 66 on the pull rod 63, Fig. 4, exerts pressure through rod 63 to swing the hook head 59 into its locking position, as shown in Fig. 4.

The pull rod 63 after it passes through the web of frame piece 33 is turned back on itself at 67 and forms a backward extension 68 which goes through the web of frame piece 33, and a collar 69 on said backward extension engages the web and restrains the spring 65 from forcing the hook beyond that position, Fig. 4. The loop 67 comes close to the rear edge of the ironing table and is spaced from its under surface, as shown in Fig. 9.

To release the ironing table from the rear the loop 67 is pulled rearwardly. This will swing the hook from locking position and allow the board to pivot on the rear legs 29 and 30, and at the same time the rearward pull on the board will swing it upon its rear legs, as indicated in dotted lines in Fig. 1. The front end of the ironing table will then swing downwardly and the rear legs will fold under the top as it drops, which effects a complete folding. The ironing table can then be hung up by the loop 67, and this method of folding will be used when, in storing the ironing table, it is hung from a support rather than rested upon the floor.

Figure 1:
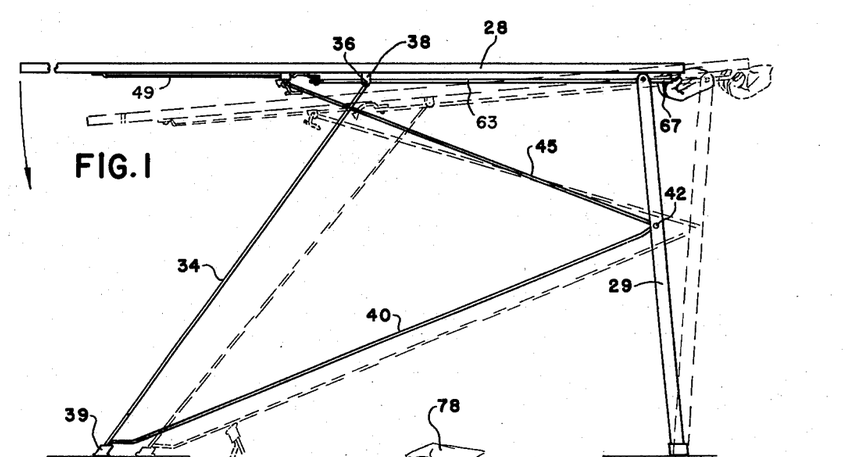
Fig. 1 is a side elevation view of an ironing table top having means applied thereto for effecting the folding of the leg structure either from the front or from the rear of the ironing table. showing in dotted lines the manner of folding the same from the rear.

In performing the folding operation as shown in Fig. 1, one hand is applied to the rear of the table to steady the same and the other hand is used to grasp the loop 67 and exert a rearward pulling action thereon, as the front leg structure swings upwardly the forward end of the table drops, as shown by the arrow. The table is then stood on its forward end to complete the folding of the rear legs. The normal resistance of the joints prevents the folding action from being sudden.

A means of folding the leg structure from the front of the ironing table, to eliminate the action of gravity in the folding operation, has been recognized as desirable, but heretofore has not been satisfactorily accomplished. My discovery does it, practically and efficiently, by a single and continuous pull on the pull member, which both unlocks the slide and swings the table legs to their folded position.

This means is well shown in Figs. 4–11 inclusive, and is shown somewhat in detail in Figs. 4, 5, 6, 7 and 8. As there shown, a pull member 70 is formed with a looped finger hold 71 which has a part 72 adapted to engage a sloping edge 73 on an upstanding lip 74 on slide member 48 when said slide member is in locking position.

Figures 7, 8:
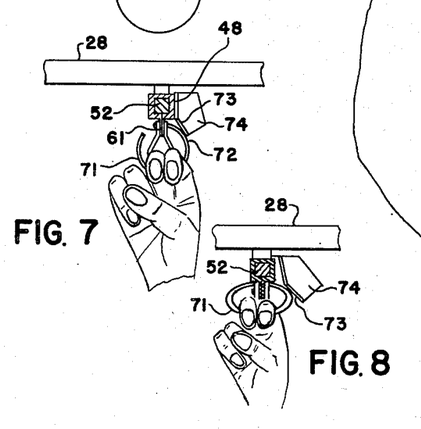
Fig. 7 is an enlarged sectional view showing the pull member on the slide in engagement with the cam edge on the hook as force is applied to the same by the hand.
Fig. 8 is a view similar to Fig. 7 wherein the force of the pull member has swung it down upon the cam face and has caused the hook to move into unlatching position.

As clearly shown in Figs. 7 and 9, in its initial position the pull member 70 will extend substantially at right angles to the under surface of the board. This member is, however, pivoted at 75 to the same member 61 upon which are pivoted the brace rods 45 and 46. Hence, when the loop 71 of the pull member has force applied to it by the hand or finger of the operator, it will first rock it on that pivot to the position shown in Fig. 10, and in doing that it will have a thrust engagement upon the upper oblique edge 73 of the upstanding lip 74. This by cam action will cause the hook member 54 to swing on its pivot 57 so as to cause the hook to swing laterally and bring the hook face 60 out of engagement with the latch 61. This releases the slide, and continuing force applied to the pull member will move the slide along one or the other of guideways 49, 52 or 53, with the result that the ironing table legs are folded together upon the under side of the top.

This operation is performed against the force of gravity and without slamming or falling, as clearly indicated in Fig. 2. In folding the leg structure in this manner the rear end of the ironing table, indicated at 76, is placed upon the floor with the ironing table in effect tipped up on the rear edge. With a hand 77 pulling on the loop of the pull member 70, as shown in Fig. 2, and another hand 78 holding the top end of the board, the slide will be drawn up along its guideway toward the front of the board, the parts folding together, as indicated in dotted lines in Fig. 2.

Thus the entire assemblage of supporting leg structure will be lifted and swung inwardly and in effect caused to engage the under side of the ironing table top, in this manner folding the leg structure so as to permit the entire folded ironing table to be taken to any desired place of deposit or storage.

With this arrangement, as shown in Figs. 1-13 inclusive, the ironing table may have its slide unlatched from the rear to collapse by gravity downwardly toward its front end or may have the slide released and drawn upwardly along the under side of the ironing table top to bring the leg structure into folded position upon the under side of the table top without slamming or liability of injury either to the operator or to the ironing table.

A second form of pull member release is shown in Figs. 14-18 inclusive, and this is identically the same as the structure shown in my application Ser. No. 557,474, of which this application is a continuation in part.

Figures 14, 19A:
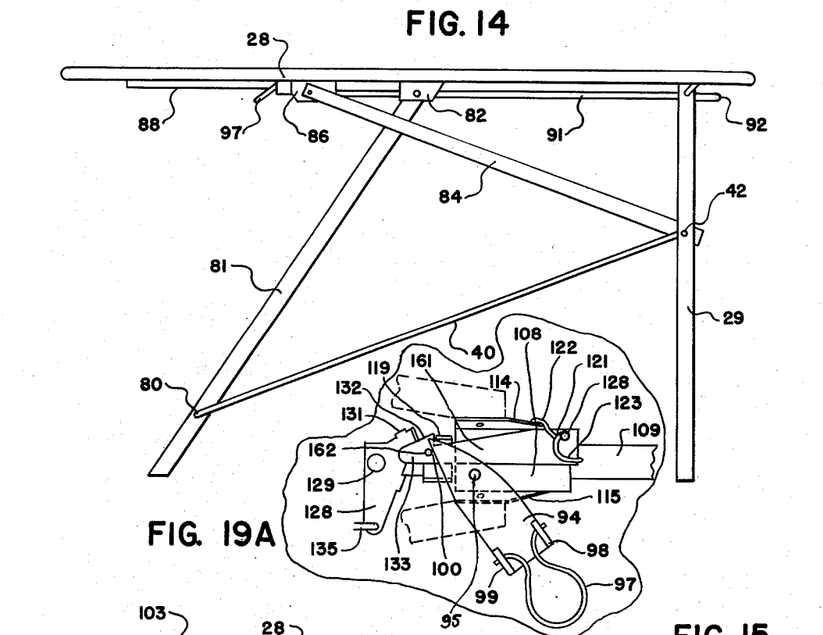
Fig. 14 is a side elevation view of an ironing table in leg-supported position, wherein another form of releasing the hook by operation of the pull member at the front is embodied.
Fig. 19A is a fragmentary plan view taken on the under side of the ironing table which shows a hook attached to the slide as in Fig. 19 operated by a swinging lever, as in Fig. 17.

In this form of the invention the ironing table top 28, the rear legs 29 and 30, and the leg connecting rods 40 and 41, which are pivoted at 42, are substantially the same as in the structure heretofore described, excepting that the leg connecting members 40 and 41 do not go to a foot at the bottom of the front leg, but are carried into a notch 80, Fig. 14, toward the bottom of the front leg member 81.

This front leg member, as shown in Fig. 14, is a single wooden member pivotally secured between bracket ears 82 and 83 fast on the under side of the ironing table top 28, and the brace rods 84 and 85 secured to slide 86 are also shown formed of wood and are pivoted to the rear legs 29 and 30 on the insides of said legs at the point shown in Fig. 14 as pivot 42.

Also the hook member 54 has substantialy the same offset point of pivoting at 57, the same sloping edge 59, and the same right-angled straight face 60 as heretofore described. In this form of the invention a latch 87 is formed directly upon the slide 86 which moves along a flat metal guideway 88, as clearly shown in Figs. 16 and 17.

Figure 16:
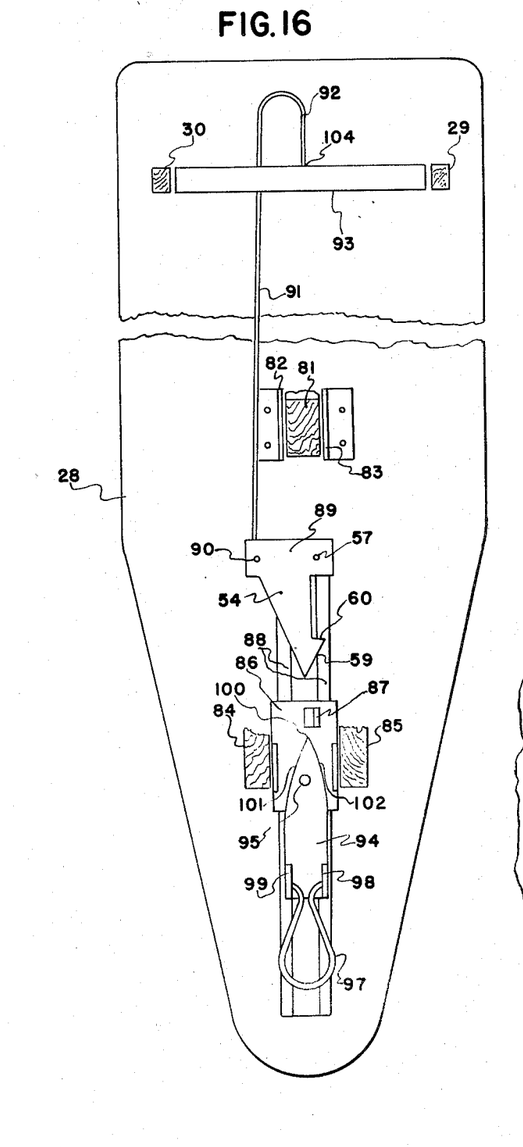
Fig. 16 is a plan view of the under side of the ironing table top on a somewhat enlarged scale showing the parts approaching the latching position.

The pivot 57 of hook member 54 is on an arm 89 formed integrally with the body of the hook member and is offset a considerable distance from a point 90 where a pull rod 91 which has a finger loop 92, is connected to the hook member. The pull rod passes through a frame-piece 93 and the loop portion 92, Fig. 16, is close to the rear end of the ironing table top where it may be conveniently grasped to rock the hook member to take its contacting face 60 from the latch 87 and to permit the legs to fold from release at the back of the ironing table in the same manner indicated in Fig. 1.

For releasing the hook from the front of the ironing table a pull member comprises a body 94 which is secured by a vertical pivot 95 to the slide 86 so as to swing in a horizontal plane. A finger loop 97 is swingably supported by ears 98 and 99 on the pull member body 94.

In front of the pivot 95 the body 94 comes to a point at 100 with curved side edges 101 and 102. The point 100 as shown in Fig. 16, comes slightly inside of the oblique wall 59 on the hook 54 so when the parts are brought into their open position the point 100 will engage the sloping wall 59 and swing the body 94 on its vertical pivot into the position shown in Fig. 17.

Figures 15, 23:
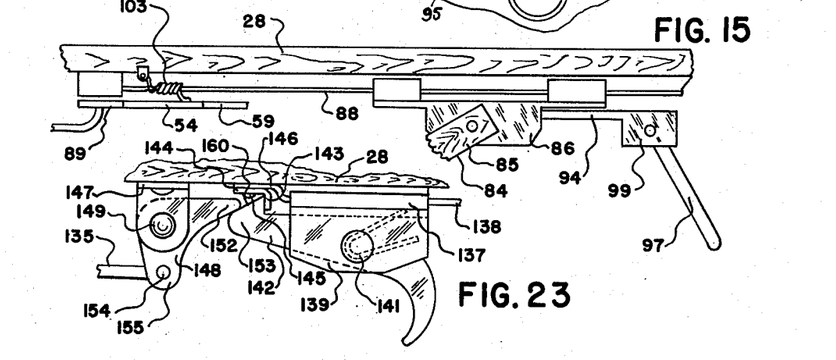
Fig. 15 is a sectional view on an enlarged scale taken through a part of the ironing table top of Fig. 14, and viewed from the opposite side of the view in Fig. 1.
Fig. 23 is a side elevation view of a form of my invention having the hook on the slide which differs somewhat from that shown in Figs. 19–22.
Figure 17:
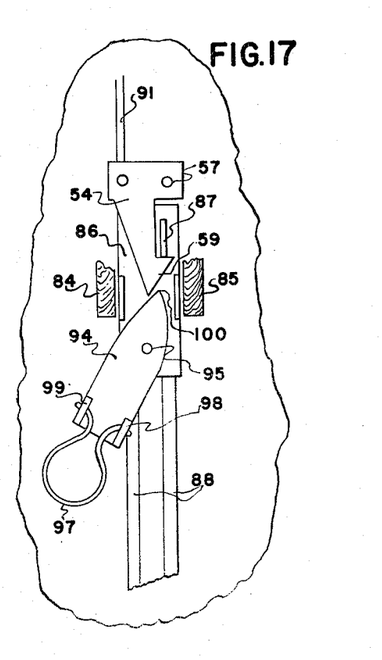
Fig. 17 is a view of a part of the under side of the ironing table top similar to the showing in Fig. 16 with the hook in locking position over the catch bar.

A spring 103, Fig. 15, is connected to the hook body 54 and the table top 28 and normally tends to hold the parts in the position of Fig. 17. The end 104 of the loop member 92 contacts the side of the transverse frame piece 93 and prevents the spring from swinging the parts further than the position indicated in Fig. 16.

In operating this form of the invention, it is only necessary for the operator with one or more fingers to engage the loop member 97 on the swingable body 94 and pull toward the front of the ironing table, as indicated in Fig. 2. This will first rock the body 94 which by engagement of the end 100 with the oblique edge 59 of hook member 54 will swing the same out of engagement with latch 87. The continued pulling on body 94 will move the slide 86 upwardly along the guideway 88 toward the front of the ironing table and at the same time through the brace rods 84 and 85 connected with the slide and with the legs will swing the entire folding leg structure toward and then upon the under side of the ironing table top, as clearly indicated in dotted lines in Fig. 2.

Figure 18:
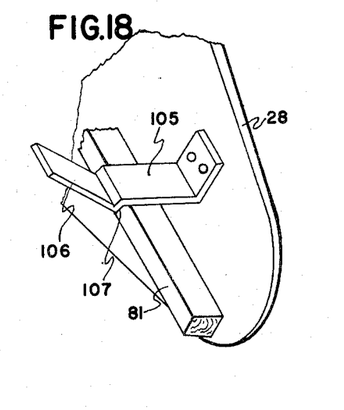
Fig. 18 is a detailed fragmentary view of the front end of the ironing board forming the ironing table top viewed from the under side to illustrate a snap catch for holding the front end of the ironing table in closed position.

A spring catch 105, Fig. 18, may be secured to the under side of the forward part of the table top 28, and the obliquely disposed arm 106 thereof will be engaged by the leg member 81 and will bring the latch portion 107 of the spring catch 105 over the leg 81 to hold it in closed position on the under side of the ironing table top. Release of this leg structure is readily effected by the hand grasping the end of the obliquely disposed catch portion 106.

Figure 19:
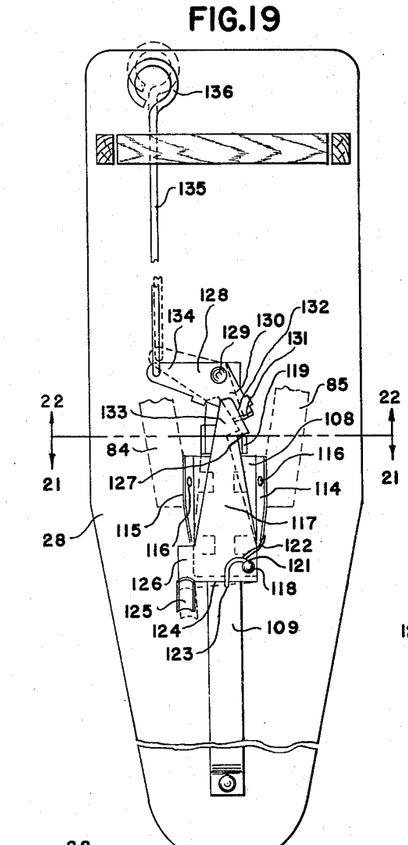
Fig. 19 is an under side plan view of a form of my invention wherein the hook is mounted on the slide.
Figures 20, 25, 26, 27:
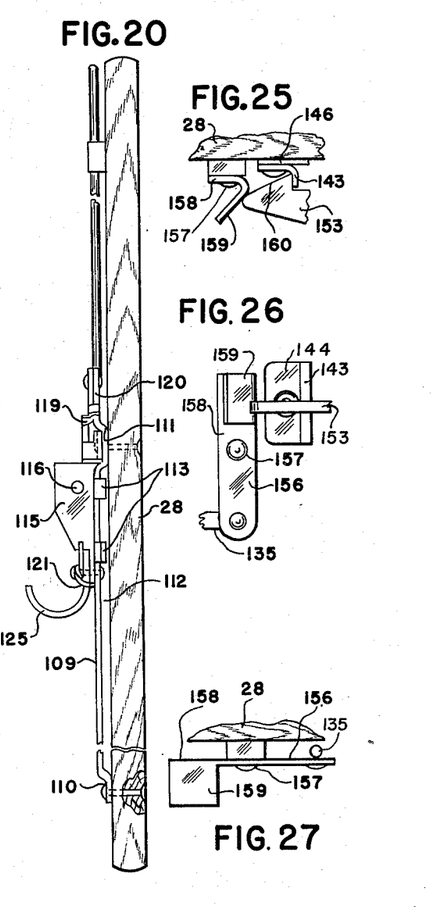
Fig. 20 is an edge view of the parts shown in Fig. 19 viewed from the right side thereof, as shown.
Fig. 25 shows a fragmentary transverse view of a vertically mounted modified means for releasing the hook from the rear of the ironing board of the type shown in Figs. 23 and 24.
Fig. 26 is a fragmentary detailed plan view of the parts shown in Fig. 25.
Fig. 27 is a fragmentary longitudinal side elevation view of those parts shown in Fig. 26.

Another form of effecting release of the locking member to fold the ironing table legs from the front of the ironing table top is shown in Figs. 19-22 inclusive. In this form a slide 108 is mounted to move along a flat and rather wide guide bar 109. This bar, as shown in Fig. 20, is bent at 110 where it is secured to the under side of the front end of the ironing table top. It is also bent at 111 where it is again secured to the ironing table top leaving a space 112 beneath it and the under side face of the top along which the guide members 113 are mounted for longitudinal movement.

As indicated in dotted lines in Fig. 19, the brace rods 84 and 85 are pivotally connected to downwardly turned ears 114 and 115 one of which is seen in Fig. 20. These ears are slightly flaring and the pivots thereto of the brace rods are indicated at 116.

In this form a hook member 117 is pivoted at 118 directly to the slide 108, and is held to move into position to snap over a latch 119 which is secured to an extension 120 of the guide bar 109, as clearly indicated in Fig. 20. A spring 121 wraps around the pivot member 118 and has an end portion 122 that takes over an edge of the ear member 114 and another end portion 123 which takes over the edge 124 of the end of the hook member 117, thus wedging the hook member into position to engage over the latch 119.

A finger-hold pull member 125 is secured to a lateral extension 126 of the hook member 117 and thus is substantially offset from the pivot point 118 thereof.

It follows that when force is applied from the hand of an operator to the member 125 the first effect will be to rock the hook member 117 upon its pivot 118 to cause the latch-engaging face 127 of the hook member to be pulled from the latch 119. Following that action continued forward pull on the finger-hold 125 will move the slide along the front of the board up the board to bring the leg structure into folded position upon the under side of the table top, in the manner indicated in Fig. 2.

To unlatch the hook member from the rear of the board a member 128 is pivoted at 129 which has an arm 130 having thereon an outwardly extending toe 131 which engages an oblique edge 132 on the hook head 133 of the hook member 117. Member 128 has a second arm 134 which extends a substantial distance from the pivot 129 to which is connected a pull rod 135 having a hand-hold ring 136 at its end adjacent the rear edge of the ironing table top.

It follows that when force is applied by the hand upon ring 136 and pull rod 135 the member 128 is rocked on its pivot 129 and the contact of toe member 131 upon the oblique edge 132 of hook head 133 will rock the hook member upon its pivot 118 to bring its face 127 out of engagement with the latch 119 and permit the ironing table leg structure to be folded in the manner indicated in Fig. 1.

Figure 24:
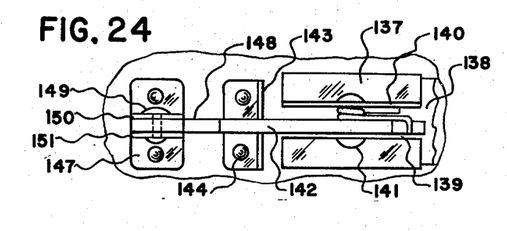
Fig. 24 shows a plan view of the same taken on the under side of the ironing table.

Another form of the invention is shown in Figs. 23, 24. As there shown a slide 137 movable along a broad guide bar 138, is formed with a pair of upstanding ear members 139 and 140 between which is mounted upon a horizontal pivot 141 a hook member 142 which is adapted to swing in a vertical plane about the horizontal pivot 141.

A latch 143 is formed as a part of a plate 144 which is secured by rivet or bolt 145 which at the same time secures the end portion 146 of the guide 138 to the under side of the table top 28.

Upon a stand 147 secured to the under side of the table top is formed a rocking member 148 pivoted at 149 between ears 150 and 151 on the stand 147. The rocking member 148 is provided with a toe 152 which engages the sloping surface 160 of the hook head 153. The pull rod 135 having thereon the finger-hold ring 136 is pivotally connected at 154 with an upstanding part 155 of the rocking lever 148. By pulling backward on the rod 135 the rocking lever 148 is rocked and will thereby in that manner disengage the hook 142 from engagement with the latch 143 and release the slide from the rear of the ironing table to permit it to fold up by gravity, as indicated in Fig. 1.

Figures 21, 22:
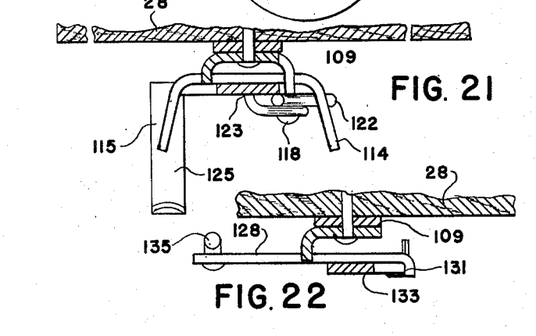
Fig. 21 is a sectional view on an enlarged scale taken on line 21—21 of Fig. 19.
Fig. 22 is a similar transverse sectional view taken on line 22—22 of Fig. 19.

Another means of releasing the hook structure shown in Figs. 22 and 23 is shown in Figs. 25, 26 and 27. In this form a lever 156 is mounted to rock about a vertical pivot 157 in a horizontal plane. The pull rod 135 is connected to the long arm of lever 156 which has on its shorter arm 158 a cam plate 159 which engages the sloping face 160 of the toe 153 of hook member 142 with a cam action. When, therefore, the lever 156 is rocked by means of force applied to the pull rod 135 the cam plate 159 comes over the upwardly turned sloping face 160 of the hook head 153 and by a sliding cam action depresses the same off of the latch 143, thus releasing the slide 137 from the rear of the ironing table and permitting the leg structure to fold upon its under side, in the manner indicated in Fig. 1.

In the modification shown in Fig. 19A the parts are generally the same as the similar parts in Fig. 19, except that a different type of hook here shown as 161 is employed which is pivoted to slide 108 at 118 and is moved by the spring 121 to come into engagement with the latch 119, all as shown. The hook has the sloping front face 132 and is operated from the rear by the rocking member 128 pivoted at 129 and moved by a pull arm 135 so that the upstanding cam piece 131 will engage the sloping edge 132 of the hook head 133 and move it from engagement with the latch 119 when force is applied to the pull arm 135 from the rear of the ironing table.

In this form the hook 161 has thereon an outwardly extended pin 162 which when in locked position, as shown, is engaged by the surface of toe member 100 on the rocking lever 94 pivoted at 95 to the slide 108. The lever member 94 is in all respects the same in this form of the invention as shown in Fig. 17, and embodies a pull loop 97 which is pivotally connected to ears 98 and 99 fast on the lever member 94.

It will be understood that the pivot member 95 is made long enough with an underlying block, not shown, so that lever 94 is mounted for horizontal movements not only above hook member 161 but also above the flange member 115, shown mostly in dotted lines in Fig. 19A.

The operation of this form of the invention will readily be understood. Both the hook 161 and the swinging lever 94 are as in Figs. 16 and 17, and the lever 94 has its short arm engageable with the pin 162 on hook 161 applied to the loop. It has the effect of first swinging the hook from engagement with the latch 119 and then will pull the slide upwardly and fold the legs exactly the same as in Figs. 1 and 16.

The advantages of my invention will be apparent from the foregoing description, providing convenient and effective means for shifting the hook to release the slide from the rear of the ironing table, and convenient and easy-operating means for enabling the ironing table to be folded from its front. In all of the forms here shown this is done by simply exerting force upon a pull member which is thereby first caused to rock on its pivot and in rocking engage some part on the hook member and cause it to be withdrawn from the latch to release the slide, and such that continued force thereafter applied to the pull member will draw the slide forward along the ironing table top and cause the leg structure to fold against that top.

I claim:

1. An ironing table embodying a top, front and rear leg units pivotally carried on the underside of the top and being swingable outwardly therefrom, a slide supported for longitudinal movement on the underside of the top and connected to one of said leg units, a latch member carried by the slide, a hook member pivotally supported on the underside of the top and being engageable in locking relationship with the latch member when the leg units are in their outwardly swung position, and a manually operable disengaging member pivotally supported on the slide for disengaging said hook member from said latch member to permit folding of the leg structure.

2. In combination with an ironing table embodying a top, front and rear leg units pivotally carried on the underside of the top and adapted to be swung to an outwardly operative position, a slide supported for longitudinal movement on the underside of the top and connected to one of said leg units, a latch member mounted on said slide, a hook-shaped member pivotally supported on the underside of the top and adapted to lockingly engage said latch member when the legs are in an outwardly swung position, and means for unlocking said members, including a first member connected to said hook-shaped member and adapted on movement to disengage said hook-shaped member from said latch, and a second manually operable means pivotally supported on the slide and adapted on movement to disengage said hook-shaped member from said latch.

3. An ironing table embodying a top, spaced apart front and rear leg units pivoted to and swingable outwardly from the top, a slide supported for longitudinal movement on the underside of said top, a pair of brace rods extending from the rear leg unit and pivotally joined at their forward ends to the slide, means for locking said leg units in an open position including a hook-shaped member pivotally connected on the underside of the top and adapted to rotatively engage said slide adjacent its connection with the brace rods, and means for unlocking said leg units including a manually operable member carried by said slide, said member having a portion positioned to abut the hook-shaped member and move the same out of engagement with the slide when said manually operable member is moved in the direction of one end of the table.

4. An ironing table embodying a top, front and rear leg units pivotally carried on the underside of the top and being swingable outwardly therefrom, a slide supported for longitudinal movement on the underside of the top and connected to one of said leg units, means for locking said leg units in their extended position, including a latch member carried by the slide, a hook member pivotally supported on the underside of the top and being engageable in locking relationship with the latch member when the leg units are in their outwardly swung position, and means for unlocking said locking means including a first manually operable member connected to said hook member and extending to the rear end of the top for disengaging said locking means from the rear end of the table, and a second manually operable member pivotally supported on the slide for disengaging said hook from said latch member and thereafter moving the slide in the direction of the front end of the table.

5. In combination with an ironing table embodying a top, front and rear leg units pivotally carried on the underside of the top and adapted to be swung to an outwardly operative position, a slide supported for longitudinal movement on the underside of the top and connected to one of said leg units, a first member mounted on said slide, a second member pivotally supported at one end on the underside of the top and having a sloping cam surface which is engageable with the first member to effect rotation of the second member into locking engagement with the first member when the legs are moved to a fully operative position, and a manually operable pull member pivotally connected to said slide and normally positioned with a cam surface juxtaposed to abut the cam surface on the second member when the pull member is rotated on its pivotal connection to disengage said second member and move the slide to one end of the table to thereby effect folding of the leg structure.

6. In combination with an ironing table embodying a top, front and rear leg units pivotally carried on the underside of the top and adapted to be swung to an outwardly operative position, a slide supported for longitudinal movement on the underside of the top and connected to one of said leg units, a hook-shaped member pivotally supported for rotative movement on the underside of the slide, a stationary latch member secured to the underside of the top and being engageable by said hook member when the legs are moved to their operative position, and manually operable means rigidly connected to said hook member to effect rotation of said member on its pivotal mounting to disengage the same from said latch member and thereafter move said slide and said leg unit in the direction of one end of a table.

7. In combination with an ironing table embodying a top and a folding leg structure secured to the underside of the top, means for locking said leg structure in an open position, including a rigid latch member secured to the underside of the top, a slide supported for longitudinal movement on the underside of the top adjacent said latch member, a hook member pivotally carried by said slide for engaging said latch member, spring means cooperable between said slide and said hook member for holding the same in engagement with said latch member, and a manually operable disengaging member pivotally supported on said slide and having a portion extending in abutting relationship with said latch and said hook-shaped member for disengaging the hook-shaped member from the latch.

8. In combination with an ironing table including a top, a folding leg structure pivotally supported on the underside of the top and adapted to be swung to an outwardly operative position, a slide supported for longitudinal movement on the underside of the top and connected to one of said leg units, a hook member pivotally connected to the slide to swing in a vertical plane beneath the top, a fixed latch member secured to the underside of the top and adapted for engagement with the hook member when the leg structure is moved to an open position, and means for unlocking the leg structure including a member pivotally supported on the underside of the top and adapted to rock in a vertical plane, a toe carried by said member and being engageable with a portion of said hook member when the latter is in its locked position with the latching member, an arm extending downwardly from said rocking member, and a rod connected to said arm and extending to the rear of the ironing table to swing said rocking member and cause the hook to be released from the latching member.

9. An ironing table embodying a top, front and rear leg units pivotally carried on the underside of the top and swingable outwardly therefrom to an open position, a guideway mounted on the underside of the top, a slide supported by the guideway and connected to one of said leg units, means for locking the leg units in an outwardly swung position, including an abutting member extending in a plane transverse to the guideway, a hook-shaped member having a pivotal mounting means at one end and a sloping cam surface at the other end which is adapted to engage the abutting member to effect rotative movement of the hook-shaped member, one of said members being mounted on the slide and the other member being mounted on the underside of the top, and manual operable means pivotally connected to the slide for movement in a plane parallel with the top, said manually operable means having a cam surface engageable with the cam surface on the hook-shaped member to disengage said hook-shaped member from the abutting member.

10. An ironing table embodying a top, front and rear leg units pivotally carried on the underside of the top and swingable outwardly therefrom to an open position, means for locking said leg units in an outwardly swung position including a slide member carried on the underside of the top and connected to one of said leg units and being movable forwardly when the legs are folded, a first latching member mounted on said slide, a second latching member mounted on the underside of the top and being engageable with the first latching member when the legs are fully opened, one of said latching members being pivotally supported for rotative movement as said members move into locking engagement, and a manually operable pull member pivotally connected to one of said members and supported by said member for movement only in a plane parallel with the top for disengaging said latching members to permit folding of the leg structure.

11. An ironing table embodying a top, front and rear leg units carried on the underside of the top and swingable outwardly therefrom to an open position, a guideway mounted on the under surface of the top, a slide member mounted on the guideway and connected to one of said leg units, means for rigidly locking the leg units in their open position including a first latching member mounted on said slide, a second latching member mounted on the under surface of the top and engageable with said first latching member when the leg structure is in its fully opened position, and a manually operable means pivotally connected to one of said members and supported by said pivotal connection for movement only in a plane parallel with the guideway to disengage said one latching member from the other latching member to permit the leg units to swingably move in the direction of the top.

12. In an ironing table having a folding leg structure, a slide connected with the leg structure and positioned on the under surface of the table, said slide being longitudinally movable along the under surface of said table when the leg structure is moved between its folded and unfolded positions, a locking mechanism cooperable with said slide for locking the slide when the leg structure is in an unfolded position which comprises a hook member pivotally mounted on the slide, a latch member engageable with said hook member, said latch member being mounted on the under surface of said table, and a manually operable means positioned on the under surface of said table and connected to one of said members, said means being operable upon movement in a longitudinal direction of the table to disengage one of said members from the other member to permit movement of the leg structure to a folded position.

13. An ironing table embodying a top, spaced apart front and rear leg units pivoted to and swingable downwardly from said top, means for rigidly locking said leg units in their downwardly swung position including a guideway mounted on the under surface of the top, a slide mounted on the guideway and connected to one of said leg units, a first member pivotally mounted on said slide, a second member engageable in locking relationship with said first member, said second member being mounted on the under surface of the top, and a manually operable means connected to one of said members for moving said member with relation to the other member in such a manner as to disengage said members whereby the leg units may be swung upwardly in the direction of the top.

KEMUEL B. OLANDER.

REFERENCES CITED

The following references are of record in the file of this patent:

UNITED STATES PATENTS

| Number | Name | Date |
|--------|------|------|
| 225,352 | DeMott | Mar. 9, 1880 |
| 1,568,980 | Kohn | Jan. 12, 1926 |
| 1,912,126 | Corduan | May 30, 1933 |
| 2,057,108 | Olander | Oct. 13, 1936 |
| 2,332,927 | Miller | Oct. 26, 1943 |